United States Patent [19]
Heller

[11] 4,025,256
[45] May 24, 1977

[54] APPARATUS FOR THE CONTINUOUS FABRICATION OF FIBER REINFORCED PLASTIC PROFILE MEMBERS

[75] Inventor: Rudolf Heller, Zurich, Switzerland

[73] Assignee: Contraves AG, Zurich, Switzerland

[22] Filed: Apr. 21, 1975

[21] Appl. No.: 569,776

[30] Foreign Application Priority Data

May 24, 1974 Switzerland .................. 7102/74

[52] U.S. Cl. .................. 425/114; 264/46.5; 425/115; 425/327; 425/817 C
[51] Int. Cl.² .................. B29F 3/10
[58] Field of Search ......... 264/134, 136, 137, 46.5; 425/115, 96, 97, 98, 327, 505, 817 C, 114, 325, 812, 324, 113, 4 C

[56] References Cited

UNITED STATES PATENTS

| | | | |
|---|---|---|---|
| 2,422,281 | 6/1947 | Adams | 425/114 |
| 2,563,397 | 8/1951 | Colombo | 425/114 |
| 3,240,846 | 3/1966 | Voelker | 425/817 C X |
| 3,341,394 | 9/1967 | Kinney | 264/136 X |
| 3,526,556 | 9/1970 | Berner | 425/4 C X |
| 3,529,050 | 9/1970 | Smith | 425/113 X |
| 3,533,133 | 10/1970 | Meitinger | 425/113 |
| 3,616,496 | 11/1971 | Anglioletti et al. | 425/113 |
| 3,637,447 | 1/1972 | Berger et al. | 264/137 X |

FOREIGN PATENTS OR APPLICATIONS

1,206,946  9/1970  United Kingdom .............. 425/114

*Primary Examiner*—Richard B. Lazarus
*Assistant Examiner*—Mark Rosenbaum
*Attorney, Agent, or Firm*—Werner W. Kleeman

[57] ABSTRACT

An apparatus for the continuous fabrication of fiber reinforced plastic profile members or sections by impregnating fibrous mats with a settable liquid plastic reaction mixture in a continuous impregnation device. Arranged after the impregnation device is a transport- and forming device for drawing-through, shaping and hardening the impregnated fibrous mats. The continuous impregnation device embodies two superimposed contact- and guide platesarranged in spaced relationship from one another, these plates conjointly forming a continuously tapering inlet zone followed by an outlet zone and at both sides of the plates two edge guiding zones communicating with the free atmosphere, the edge guiding zones serving for the guiding of the side or marginal edges of the throughpassing fibrous mats. One of the contact plates is provided with an impregnation recess between the inlet zone, outlet zone and the lateral edge guide zones, this impregnation recess being positionally oriented transversely with respect to the direction of throughpassage of the fibrous mats and being connected at delivery lines or conduits for the liquid plastic reaction mixture which is at excess pressure.

8 Claims, 2 Drawing Figures

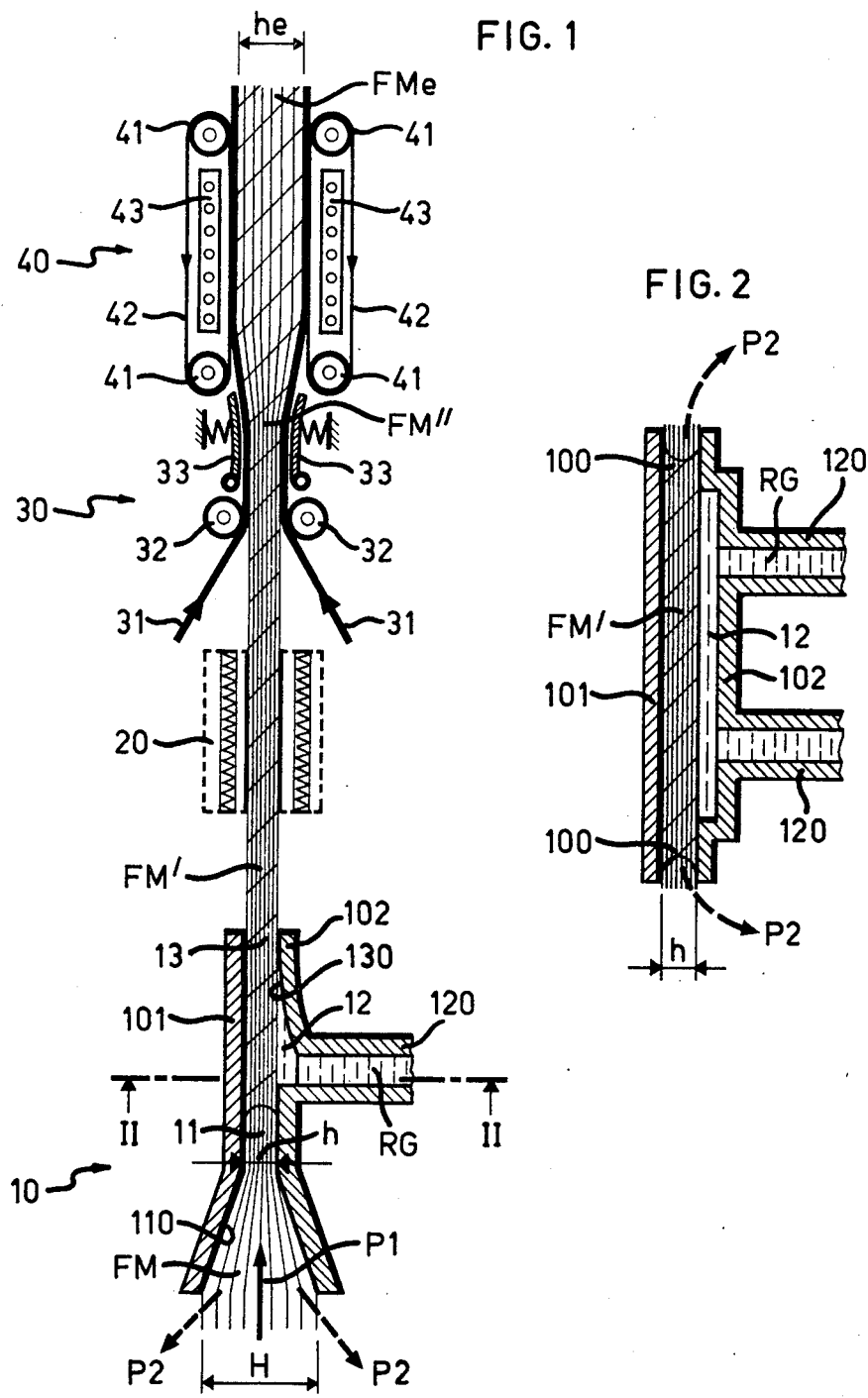

APPARATUS FOR THE CONTINUOUS FABRICATION OF FIBER REINFORCED PLASTIC PROFILE MEMBERS

BACKGROUND OF THE INVENTION

The present invention relates to a new and improved construction of apparatus for the continuous fabrication of fiber-reinforced plastic profile members or sections, hereinafter simply conveniently referred to as profile members, by impregnating fibrous mats with a hardenable or settable liquid plastic reaction mixture in a continuous impregnation device after which there is arranged a transport- and forming device for pulling-through, forming and hardening the impregnated fibrous mats.

With heretofore known devices or equipment of the previously mentioned type the drawn-through fibrous mats in front of rotating impregnation rollers are brought into contact with the liquid plastic reaction mixture by means of nozzles which spray such plastic reaction mixture onto the fibrous mats or also between individual layers thereof. Since the reaction mixtures which are employed are inherently tacky they adhere to the impregnation rollers and with time harden or set thereat, so that the rollers are soon blocked and/or fibers or threads are engaged from the throughpassing fibrous mats and the engaged fibers or threads wound onto the impregnation rolls, something which is obviously not desired.

SUMMARY OF THE INVENTION

Hence, it is a primary object of the present invention to provide an improved construction of apparatus for the continuous fabrication of fiber reinforced plastic profile members in a manner not assocciated with the aforementioned drawbacks and shortcomings of the prior art systems.

Another object of this invention aims at overcoming the aforementioned shortcomings of the prior art equipment by providing an improvement and novel construction conception of the continuous impregnation device.

In keeping with the foregoing objectives it is a further object of this invention to especially avoid the use of movable components which can come into contact with the liquidous plastic reaction mixture but without however impairing the complete displacement of the air previously contained in the incoming fibrous mats and without impairing the complete imbuement of all fibers with the liquidous plastic reaction mixture.

Now in order to implement these and still further objects of the invention, which will become more readily apparent as the description proceeds, the equipment of this developement is manifested by the features that the continuous impregnation device comprises two superimposed contact- and guide plates arranged in spaced relationship from one another, the guide plates possessing a substantially rectangular configuration in plan view. These contact- and guide plates collectively form a continuously tapering or constricting inlet zone, followed by an outlet zone and at both sides or marginal edges of such plates edge guide zones for the side or marginal edges or the throughpassing fibrous mats, the aforesaid edge guide zones — also sometimes referred to herein as marginal guide zones — communicating with the free or ambient atmosphere. Of these two contact- and guide plates one of them, considered as the lower guide plate contains between the inlet zone, the outlet zone and the lateral marginal or edge guide zone an impregnation recess or channel extending transversely with respect to the direction of throughpassage of the fibrous mats. The aforesaid impregnation recess is connected with infeed lines or conduits for the liquid plastic reaction mixture which is at an excess pressure.

It is advantageous to construct the arrangement such that the impregnation recess or channel in the lower contact plate extends downwardly or drops-off from the inlet or inflow slot of the inlet zone via a sharp-edged, straight step and following such asymptotically merges with the outlet slot of the outlet zone, and further, the outlet zone at the top and bottom is stepped or offset towards the outside over sharp edges. Furthermore, in order to insure that the traveling conveyor bands or belts of the transport- and forming device do not come into contact with the liquid plastic reaction mixture, it is advantageous to arrange in front thereof a device for the continuous coating of the upper and lower faces of the impregnated fiber mat with dry coating foils and also to provide additional guide plates which contactingly bear against the coated fiber mat. As the coating material there can be used in the most simple arrangement paper sheets or bands if there is not provided a permanent reinforcement of the final product, e.g. one equipped with unidirectional glass fiber plastic laminates or sheet metal plates.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 is a partially sectional side view of the complete apparatus of this developement shown schematically; and FIG. 2 is a cross-sectional view of the apparatus of FIG. 1 taken substantially along the line II-II thereof.

DETAILED DESCRIPTION OF THE PREFERRED EMOBODIMENTS

Turning attention now to the drawing, it is to be appreciated that the apparatus, while shown in FIG. 1 in vertical orientation, typically operates in a horizontal arrangement i.e., conceptually the showing of FIG. 1 is simply rotated through an angle of 90° into a horizontal position.

With the continuous impregnation device shown in FIGS. 1 and 2 and designated in its entirety by reference character 10 it is to be understood that the same is constructed for the purpose of imbuing fibrous mats FM which for instance are stacked in layers over one another with a liquid, foamable plastic reaction mixture RG which hardens or sets while in a foamed condition, for instance with a conventional rigid polyurethane foam-reaction mixture. It is to be appreciated that the imbuing of the superimposed fibrous mats FM with the plastic reaction mixture RG occurs while completely displacing the air entrained within the layers of the fibrous mats and the impregnation device 10 cooperates with a transport device 40 arranged at the end of the appparatus and which serves to pull-through the layers of superimposed fiber mats FM which are delivered by not particularly illustrated but conventional supply rollers.

The glass fiber mats FM advantageously predominantly consist of circular coils or spirals deposited in superimposed fashion on top of one another and offset parallel to the plane of the mats, the circular coils being formed of thin, long glass fibers which are bonded with one another at localized positions by means of a suitable bonding agent, for instance rubber latex. The total amount of adhesive or bonding agent should only amount to approximately 4 to 6% by weight of the total weight of the entire fiber mats. The mat weight preferably amounts to about 50 to 150 grams per square meter and per millimeter thickness. The bonding agent should insure that the glass fibers will not undesirably detach themselves from the glass fiber mats during processing. On the other hand even in the presence of relatively low forces, for instance owing to the expansion of the foaming pressure of the plastic reaction mixture RG which is later distributed in the fibrous mats there should be possible an increase in the thickness of the mats due to localized rupture or disintegration or dissolving of the bonding locations.

Additionally, it is possible in conjunction with the described fiber or fibrous mats to introduce from special supply rollers at the top face or bottom face of the fibrous mats or in the form of intermediate layers, mesh-like or gauze- or fabric-like fibrous bands, or also individually or partially interbonded unidirectional fiber bundles into the continuous impregnation device 10 for the purpose of providing a special reinforcement of the final product at desired zones or regions thereof.

Continuing, it is to be observed that the impregnation device or means 10 consists of first contact and guide plate 101 and a second contact and guide plate 102, wherein as a matter of convenience in the description to follow but in no way limiting of the invention, the plate 101 will be considered as the upper contact and guide plate and the plate 102 as the lower contact and guide plate. Moreover, each of the aforementioned plates 101 and 102 are advantageously of rectangular configuration in plan view and connected with one another such that at both of the side edges or flanks thereof they leave open or free at least localized open edge or marginal guide slots 100 defining marginal or edge guide zones for the side or marginal edges of the throughpassing fiber mats FM, and it is to be appreciated that such marginal or edge guide slots communicate with the ambient or free atmosphere, all as particularly well recognized by referring to the showing of FIG. 2.

Now between an inlet slot 11 of an inlet zone and an outlet slot 13 of an outlet zone of the impregnation device 10 there is formed at the lower contact- and guide plate 102 a recessed impregnation recess or channel 12. The impregnation recess 12 is flow connected via or more conduits or lines 120 with a pressurized source for the liquid plastic reaction mixture RG. Both in front of the inlet slot 11 as well as also in front of the outlet slot 13 the fiber or fibrous mats FM pass through an inlet zone 110 and an outlet zone 130 respectively, which in the direction of travel of the fibrous mats continuously taper or constrict and are formed by appropriately inclined constructed guide surface of the contact- and guide plates 101 and 102 of the impregnation device 10.

In the inlet zone 110 in front of the inlet slot 11 the original layer thickness H of the incoming dry glass fiber layers or mats FM and which contain entrained air is reduced to about the value H/4 namely, to the inner height $h$ of the inlet slot 11 and outlet slot 13 and the edge guide slot 100 of the throughpassage channel for the mats. The outlet zone 130 internally of the widened impregnation recess or channel 12 in front of the outlet slot 13 prevents a damming-up of the mats FM or individual glass threads or fibers upon entry into the outlet or discharge slot 13. In the impregnation recess or channel 12 there is maintained a liquid pressure in the order of about 5 to 15 atmospheres excess pressure by uniformly continually supplying reaction mixture RG via the conduits 120 as long as the glass fiber mats FM pass through in the direction of the full line arrow P1. Consequently, there is brought about a complete imbuing of the consolidated or compacted glass fiber mats FM located at the region of the impregnation recess 12, with complete displacement of air in the direction of the broken line arrows P2 out of the inlet slot 11 and out of both of the lateral edge guide slots 100, so that there departs from the outlet slot 13 a consolidated or compacted fiber band FM', which is uniformly imbued with the reaction mixture with the exception of the lateral guide edges.

The liquid pressure in the impregnation recess or channel 12 should not be so great that liuid plastic reaction mixture escapes out of the inlet zone 11 and/or out of the lateral guide slots 100, yet should be large enough that the employed plastic reaction mixture is capable of completely and homogeneously imbuing the introduced and compacted glass fiber mats FM.

According to the showing of FIG. 1 the glass fiber band arrangement FM' imbued with the liquid reaction mixture RG in the impregnation device 10, if desired, travels through an oven or furnace 20 and afterwards through a coating device or means 30. Such serves to coat in conventional manner the upper or top face and the lower or bottom face of the glass fiber band arrangement or band FM' with dry cover foils or sheets 31, for instance consisting of glass fabric, unidirectional glass fiber laminates or metallic foils. For the purpose of pressing such cover layers or foils 31 against the aforementioned faces or surfaces of the glass fiber band arrangement FM' there are advantageously provided the contact or press rolls 32 and the additional guide plates 33. The thus coated glass fiber band FM" is drawn out of the previously or upstream arranged treatment devices by means of a conventional transport device or mechanism 40. This transport device 40 embodies upper and lower endless conveyor bands or belts 42 which are driven via the rollers 41, and which conveyor belts are not wetted or imbued with the reacton mixture owing to the previously undertaken coating of the glass fiber band or band arrangement FM'. The treatment devices arranged in front of or upstream of the transport device 40, considered with respect to the direction of travel of the fiber band FM', in he embodiment under discussion, are the devices 10, 20 and 30. In the transport device 40 there can be mounted in conventional manner cooling- or heating plates 43. The distance he between the sections or runs of the conveyor belts 42 which bear against the glass fiber band FM" allows a glass fiber band, such as the band FM" impregnated with the foamable reaction mixture to expand so that there is realized a corresponding increase in the thickness thereof during the travel through the transport device or mechanism 40, and the time of passage through such transport mechanism 40 i.e., the length of such transport mechanism is sufficient to insure for an adequate pre-hardening of the throughpassing band. With the aid of conventional, and therefore not particularly shown, cutting devices the final product FMe can be cut at both of the side edges or flanks and cut to desired plank lengths.

The apparatus shown by way of example in the drawing is intended for the continous fabrication of boards or beams coated at both sides, the core of which between the outer layers is formed as microcellular foamed structure homogeneously reinforced with a high proportion by weight of glass fibers, amounting to for instance 20 to 50% by weight. Such a foamed structure can be adjusted to densitities in the order of 50 to 600 grams per liter by appropriately calculating the final thickness $he$ and owing to its good strength- and processing or machining properties because of the relatively high content of reinforcing glass fibers can be considered as an ideal synthetic wood.

There can also be used a liquid reaction mixture which for instance hardens or sets into an open pore or open cell soft foam, or there can be even used a non-foamable liquid reaction mixture, the final thickness of which then would be selectd to correspond approximately to the inner width $h$ of the slots 11, 13 and 100 of the impregnation device 10, so that there would be formed a high strength, rigid final product having a density of about 1500 grams per liter.

While there is shown and described present preferred embodiments of the invention, it is to be distinctly understood that the invention is not limited thereto, but may be otherwise variously embodied and practiced within the scope of the following claims. Accordingly,

What is claimed is:

1. An apparatus for the continuous fabrication of fiber reinforced plastic profile members, comprising a continuous impregnation device for impregnating fibrous mats with a liquid hardenable plastic reaction mixture, said fibrous mats moving in a predetermined direction of travel, a transport and forming device arranged after said continuous impregnation device with respect to the direction of travel of the fibrous mats for drawing-through, forming and hardening the impregnated fibrous mats, said continuous impregnation device comprising two superimposed and spaced contact and guide plates, said two contact and guide plates successively forming a continuously tapering inlet zone and an outlet zone, and at both sides of the contact and guide plates two edge guide zones for receiving the marginal edges of the through-passing fibrous mats, said two edge guide zones formed by confronting surfaces of said spaced contacting and guide plates freely communicating with the ambient atmosphere, the spacing between the confronting surfaces forming said two edge guide zones being effective for compressing the marginal edges of the throughpassing fibrous mats for restricting the lateral outflow of impregnated plastic through the marginal edges of the through-passing fibrous mats into the atmosphere while at the same time permitting air entrained in the fibrous mats to escape to the atmosphere through the marginal edges of the fibrous mats, one of said contact and guide plates being provided with an impregnation recess at a location between the inlet zone, the outlet zone and the lateral edges guide zones, said impregnation recess being positionally oriented transversely with respect to the direction of travel of the fibrous mats, said impregnation recess in the lower contact and guide plate descending via a sharp edged, linear step from the inlet zone and spaced thereafter asymptomatically merging with the outlet zone, and infeed conduit means flow communicating with said impregnation recess for the infeed of the liquid plastic reaction mixture which is under pressure.

2. An apparatus for the continuous fabrication of fiber reinforced plastic profile members comprising an impregnation device for impregnating fibrous mats with a hardenable liquid plastic reaction mixture, said impregnation device having a throughpassage channel possessing a predetermined height and serving for the movement therethrough of the fibrous mats in a predetermined direction of travel, a transport device arranged after said impregnation device with respect to the direction of travel of the fibrous mats for drawing the impregnated fibrous mats through the impregnation device, said impregnation device comprising two superimposed and spaced contact and guide plates, said two contact and guide plates defining therebetween the throughpassage channel and providing a tapering inlet zone and an outlet zone, and at both sides of the contact and guide plates two edge guide zones for receiving the marginal edges of the throughpassing fibrous mats, said two edge zones formed by confronting surfaces of said spaced contacting and guide plates freely communicating with the ambient atmosphere, the spacing between the confronting surfaces forming said two edge guide zones being effective for compressing the marginal edges of the throughpassing fibrous mats for restricting the lateral outflow of impregnated plastic through the marginal edges of the through-passing fibrous mats into the atmosphere while at the same time permitting air entrained in the fibrous mats to escape to the atmosphere through the marginal edges of the fibrous mats, one of said contact and guide plates providing an impregnation chamber at a location between the inlet zone, the outlet zone and the lateral edge guide zones, said impregnation chamber terminating inwardlly of the two edge guide zones and extending transversely with respect to the direction of travel of the fibrous mats, said impregnation chamber, viewed in the direction of travel of the fibrous mats, including a substantially step-like portion following the inlet zone and spaced therefrom transforming by means of a substantially wedge-shaped portion into said predetermined channel height at the region of the outlet zone, and infeed conduit means flow communicating with said impregnation chamber for the infeed of the liquid plastic reaction mixture which is under pressure.

3. The apparatus as defined in claim 2, wherein the impregnation chamber transforms substantially asymptotically into said predetermined height.

4. The apparatus as defined in claim 2, further including means for continuously coating the upper and lower sides of the impregnated fibrous mats with dry coating foils, said coating means being arranged between the impregnation device and the subsequently arranged transport device.

5. The apparatus as defined in claim 4, further including resiliently biased upper and lower guide plates arranged between the coating means and the transport device for contacting the coated fibrous mats.

6. The apparatus as defined in claim 4, especially for the continuous fabrication of plates of fiber reinforced hardened plastic foam, wherein the transport device comprises a pair of cooperating transport bands for forming the fibrous mats and enabling the fibrous mats to increase in thickness to a final thickness which is greater than said predetermined height of the throughpassage channel.

7. The apparatus as defined in claim 6, wherein the transport device further includes heating means.

8. The apparatus as defined in claim 2, wherein the infeed conduit means for the infeed of the liquid plastic reaction mixture to the impregnation chamber is only located to one side of the throughpassing fibrous mass.

* * * * *